Feb. 14, 1956   H. F. GEISLER   2,734,540
METHOD OF SEPARATING MEAT

Filed Sept. 16, 1955   2 Sheets-Sheet 1

INVENTOR.
H. F. GEISLER
BY
*Yates Dowell*
ATTORNEY

Feb. 14, 1956      H. F. GEISLER      2,734,540
METHOD OF SEPARATING MEAT
Filed Sept. 16, 1955      2 Sheets-Sheet 2
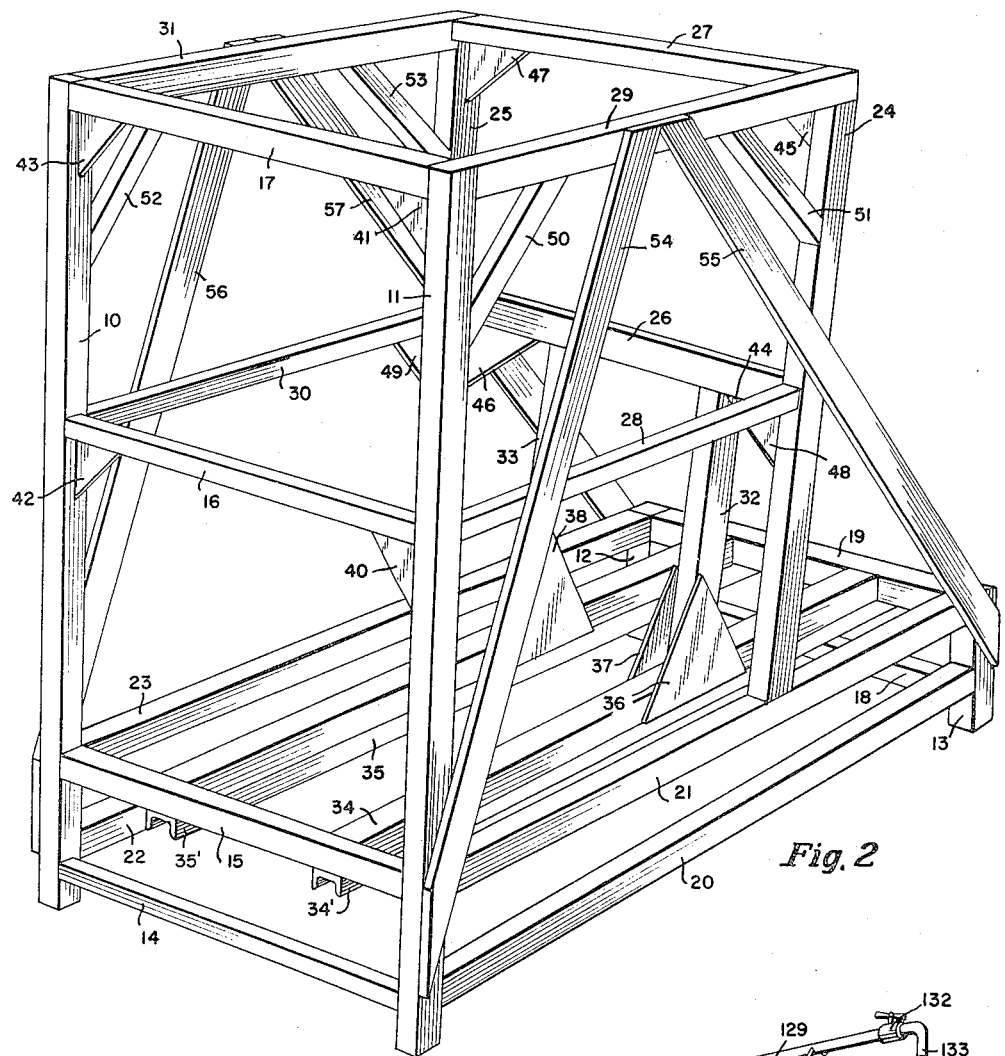
Fig. 2
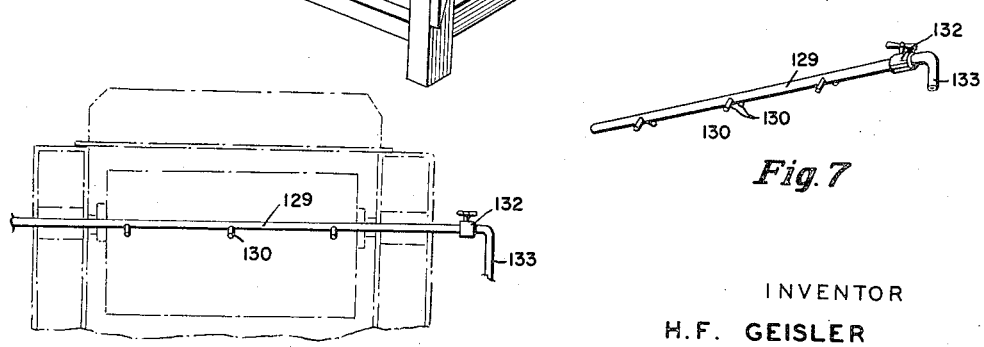
Fig. 6
Fig. 7
INVENTOR
H. F. GEISLER
BY
ATTORNEY

United States Patent Office

2,734,540
Patented Feb. 14, 1956

2,734,540

METHOD OF SEPARATING MEAT

Harold F. Geisler, Tucker, Ga., assignor to Meat Separator Corporation, Atlanta, Ga., a corporation of Georgia Application September 16, 1955, Serial No. 538,649

4 Claims. (Cl. 146—222)

This is a continuation-in-part of application Serial No. 345,915, filed March 31, 1953, by Harold F. Geisler and John R. Thompson.

This invention relates to material separation including the method of separating relatively soft from relatively hard portions of substances, edible or otherwise, and particularly for separating edible from inedible substances including removing meat from the neck and other bones of chickens, turkeys and other fowls, removing the edible from the inedible portions of certain seafoods such as crabs, lobsters, fish and the like, as well as for removing edible from inedible portions of certain animals.

The separation of relatively soft substances, some of which are edible, from harder substances has been tedious and difficult, and has resulted in substantial waste of material and revenue. An example of this has been waste resulting from the inability to readily separate meat of the necks of chickens, turkeys and other fowls from the edible bone portions of the same.

It is an object of the invention to provide a method for separating soft from relatively hard portions of substances, edible or otherwise, particularly for separating edible and inedible substances including removing meat from neck and other bones of chickens, turkeys and other fowls, removing the edible from inedible portions from certain seafood such as crabs, lobsters, fish and the like, as well as for removing edible from inedible portions of certain animals and collecting the same for further processing, distribution or direct use of the product.

Another object of the invention is to provide a method which is relatively simple and durable and by which a relatively large quantity of usable substance may be obtained in proportion to the quantity of material treated, and a method which is simple and easy to practice and by means of which separation can be efficiently and economically accomplished.

Figure 1:
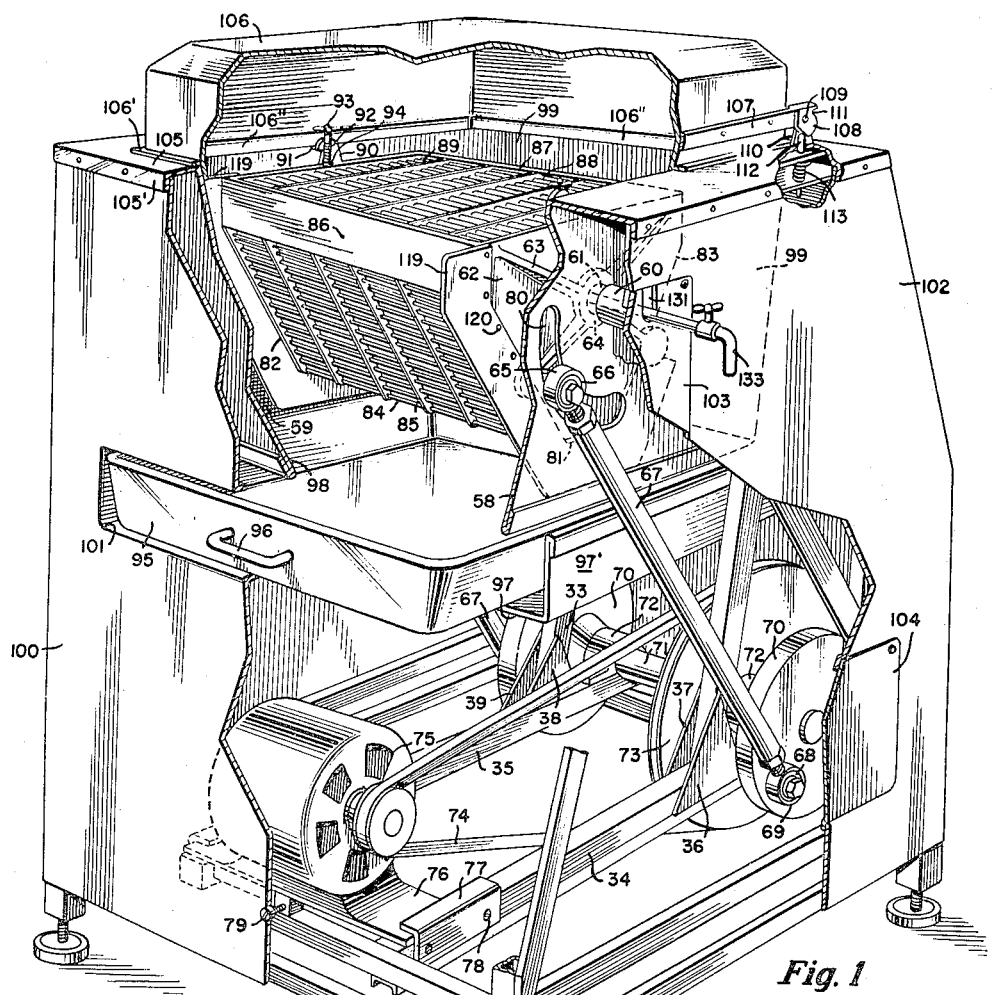
Figure 5:
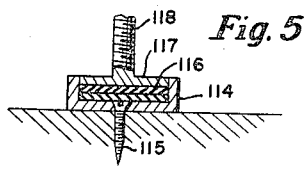
Figure 4:
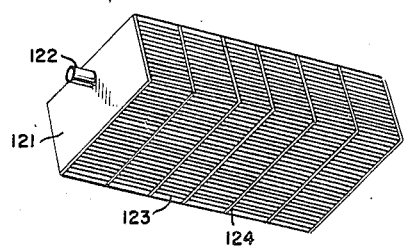
Figure 3:
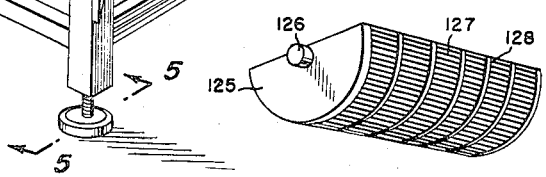

Further objects and advantages of the invention will be apparent from the following description taken in conjunction with the accompanying drawings, wherein:

Fig. 1 is a perspective view with parts broken away illustrating one application of a machine by which the invention may be accomplished;

Fig. 2, a similar view of the frame of the machine;

Fig. 3, a modified form of container which may be used with the machine;

Fig. 4, another form of container usable with the machine;

Fig. 5, an enlarged sectional view of a form of resilient support and leg adjustment for supporting the machine taken along the line 5—5 of Fig. 1;

Fig. 6, a section of the basket and frame in phantom disclosing the fluid supply pipe and nozzles; and, Fig. 7, a perspective of the fluid supply pipe and nozzles.

With continued reference to the drawings, the machine by which the method of the present invention is practiced comprises a supporting frame having tall upright front posts 10 and 11 and relatively short rear posts 12 and 13. The front posts are connected by horizontal members 14 and 15 adjacent their bottom ends, a central horizontal connecting member 16 and an upper horizontal connecting member 17. The rear legs 12 and 13 are connected by a pair of transverse or horizontal members 18 and 19. The front and rear posts 11 and 13 on one side of the machine are connected by parallel supporting bars 20 and 21, and on the opposite side of the machine the posts 10 and 12 are connected by corresponding parallel bars 22 and 23.

Intermediate upright posts 24 and 25 are mounted on the bars 21 and 23 at opposite sides of the machine and these posts are connected by an intermediate horizontal bar 26 and an upper horizontal bar 27. Also at the said one side of the machine the posts 11 and 24 are connected by an intermediate horizontal brace or bar 28 and a top horizontal connecting bar 29 while the posts 10 and 25 are connected by an intermediate brace or bar 30 and a top brace or bar 31. The horizontal bar 26 is additionally supported by posts 32 and 33 having their lower ends resting upon box-shaped beam members 34 and 35 reinforced by channel members 34' and 35', which channel members connect the front horizontal bar 15 with the rear horizontal bar 19. Triangular reinforcing plates 36 and 37 are connected to the bar 34 and post 32 and similar plates 38 and 39 (Fig. 1) connect the posts 33 with the bar 35.

Corner brackets or gusset plates 40 and 41 reinforce the joints between the horizontal bars 16 and 17 and the corner post 11 and in like manner, corner brackets or gusset plates 42 and 43 reinforce the joints between the horizontal bars 16 and 17 and the corner post 10. In like manner the joints between the horizontal bars 26 and 27 and the upright post 24 are reinforced by brackets or gusset plates 44 and 45 and between the other upright post 25 and bars 26 and 27 by gusset plates or brackets 46 and 47. To reinforce the connection between the horizontal bar 28 and the post 24 is a bracket or gusset plate 48 and to reinforce the connection between the horizontal bar 30 and the post 25 at the opposite side of the machine is a reinforcing bracket or gusset plate 49.

Struts 50 and 51 respectively reinforce and connect the upper horizontal bar 29 with the front post 11 and the rear post 24 on one side of the frame, and on the opposite side of the frame similar struts 52 and 53 respectively reinforce and connect the horizontal bar 31 with the front post 10 and the rear post 25. Also at each side of the machine, the top or horizontal bar 29 is connected by a diagonal brace 54 with the lower end of the front post 11 and by a diagonal brace 55 with the upper end of the rear post 13. These diagonal braces may be connected to other braces and posts which lie in their paths for obtaining greater rigidity. On the opposite side of the machine a diagonal brace 56 connects the intermediate portion of the top horizontal bar 31 with the lower portion of the front post 10 and a similar brace 57 connects the intermediate portion of the top bar 31 with the upper portion of the rear post 12. Thus a strong rigid frame structure is provided which will withstand the shock, stress and strains to which it is subjected and without the vibration causing it to move from its location.

On the inner side of horizontal bars 28 and 29 at one side of the machine is located a plate 58 and a similar plate 59 is located at the opposite side of the machine in contact with the bars 30 and 31. Opposed bearings 60 located outwardly of said plates at each side of the machine are suspended from and fixed to horizontal top bars 29 and 31, such opposed bearings 60 serving to support an outwardly projecting pivot pin 61 carried in bosses of opposed end plates 62 which are reinforced by ribs 63 radiating outwardly from bosses 64. Each end plate 62 is provided with a pair of crank pin bosses so that identical plates may be used, one at each end of the screening cage but with only the bosses adjacent the front of the machine drilled in proper alignment to receive crank pins 65 spaced radially from pivot pin 61, which crank pins are encircled by bearings 66 attached to adjustable length connecting rods 67, one at each side of the machine. Each connecting rod 67 is connected at its lower end by an additional bearing 68 with a crank pin 69 on disk wheel 70 at each side of the machine, such disk wheels being fixedly mounted in registering positions on a shaft 71 in pillow block bearings 72. At each side of the machine adjacent the disk wheels and on the shaft 71 is fixed a relatively large pulley 73 which is driven by a belt 74 from a motor or other source of power 75.

The motor has a supporting base, the ends 76 of which slide along the box-shaped beam members 77 by bolts or other fasteners 78. An adjusting screw 79 in the front of the cabinet of the machine serves to vary the tension on the belt 74. This adjusting screw engages the plate or a projection on the frame and when rotated causes the motor to move forwardly or rearwardly to vary the tension on the drive belt 74.

Operation of the belt 74 by the motor 75 produces rotation of the pulley 73 and the disk wheels 70 rotating the crank pins 69 which reciprocate the connecting rods 67 to impart oscillatory movement to the ends 62 of the container, the crank pins 65 moving in curved slots 80 of the plates 58, 59 of the machine. The end plates 62 have straight bottom edges 81 and sloping front and rear straight edges 82 and 83 and such end plates have their spaced bottom, front, and rear edges connected by spaced parallel bars or rods 84, the ends of which preferably are welded within openings in the end plates. Also the parallel bars along the bottom, front, and rear sides are provided with transverse reinforcing strips 85 of which there are preferably five in number, each provided with openings in which the bars or rods 84 are received and welded. Front and back top reinforcing strips extend between the end plates and are welded at their ends to such plates and to the intermediate reinforcing strips 85 of which also there are preferably five in number.

The screening cage is provided with a top cover or lid having a frame 87 which may be hinged at its rear upper edge and comprises parallel rods or bars 88 with a series of reinforcing strips 89, rods or bars 88 having their ends welded within receiving openings in the frame 87 and also being received within openings in and welded to the reinforcing bars 89 which in turn are welded to the frame. A hook 90 is mounted on each end plate 62 of the screening cage and is engaged by a lug 91 having a threaded body 92 in which the screw 93 is disposed, said screw being mounted by a swivel joint such as a ball and socket joint 94 on the cover.

Beneath the container or screening cage in which the material is treated is mounted a pan 95 having a handle 96 by which it may be removed, such pan being slidably supported on a channel shaped panel 97 extending across the frame and having upstanding flanges 97' at each side outwardly of the plates 58 and 59. A housing for the container is provided by a front plate 98 and a rear plate 99 suspended from the front bar 17 and the rear bar 27 respectively and connected to plates 58 and 59.

A housing for the mechanism is provided by means of a plate 100 extending across the entire front of the machine and provided with an opening 101 through which the tray or pan 95 may be inserted and removed. Plates 102 are attached to the frame at each side of the machine, each side plate being provided with a removable section 103, to afford access to the bearings 60 and 66 in the upper portion of the machine, and another removable section 104 to afford access to the bearings 68 in the lower portion of the machine. A top member 105 is employed which may be integral with side plates 58 and 59 and front and back plates 98 and 99. Said top member overlies the top frame members 17, 27, 29 and 31 and has a downwardly extending flange 105' disposed outwardly of the side walls and front and rear walls. The machine is provided with a cover 106 having a horizontal flange 106' overlying the top member 105. The cover also has a downwardly extending rib 106" which extends into the opening in the top member 105 to prevent meat from collecting on the latter. The cover is mounted by hinges having arms 107 attached to the cover and cam portions 108 connected by pivots 109 with supporting lugs 110 pivotally mounted on the top member 105. The cam portions 108 are provided with notches 111 which are adapted to be engaged by pins 112 projected by springs 113 so that when the cover is raised it will be held in open position until it is pulled down into closed position, the spring pressed pin also reacts with cam portion 108 to resiliently hold the cover in closed position.

If desired, leveling feet may be provided including socket members 114 adapted to be secured to the floor by means of screws 115, said socket members each being adapted to receive a pair of cushioning pads 116 which support disk feet 117 to which are attached threaded studs 118 which screw into each of the corner posts of the machine. The disks 117 may be rotated for leveling the machine. Although the leveling feet beneath the corner posts have been disclosed with the reinforced frame structure, the use of these feet is not imperative as the machine will not move about the floor, but will remain stationary, and on account of its rugged construction the machine will last indefinitely notwithstanding the shock caused by the change in direction of movement of the screening cage for the material treated.

A guard 119 is attached by fasteners 120 to each end plate 62 of the screening cage along the forward, bottom and lower rear edges of the end plates to prevent the material discharged from the container through the spaces between the bars or rods 84 from passing through the arcuate slots 80.

The screening cage which has been described as having a relatively narrow flat bottom with sides extending at obtuse angles therefrom and with a substantially larger removable top has been found most satisfactory. However, it is contemplated that screening cages of other shapes, as for example that of semi-cylindrical shape, as shown in Fig. 3, or of rectangular shape as illustrated in Fig. 4 may be employed. In Fig. 4 the screening cage comprises end member 121 provided with pivot studs 122 and such ends are connected by means of parallel rods or bars 123 reinforced by strips 124 corresponding to the rods or bars 84 and the strips 85 of the screening cage of Fig. 1. In Fig. 3 end members 125 are provided with bearing studs 126 and similar rods 127 and are reinforced by strips 128, the rods being welded to the ends and to the reinforcing strips in the structures of both Figs. 3 and 4. In practicing the method of the present invention the screening cage or container provides an impact portion or portions serving to receive the impact of the moving material to cause separation thereof.

It has been found that a screening cage or container of a width between side plates 62 of approximately 17¾ inches, with the dimension from front to rear at the top of approximately 14 inches, a bottom dimension from front to rear of approximately 4 inches, and a height of approximately 10¾ inches, has been highly satisfactory. The height or width of top plates 86 is approximately 3¼ inches. The rods or bars 84 are preferably of stainless steel approximately ⅛ inch to 3/32 of an inch in diameter and spaced apart approximately 5/32 of an inch. The cross sectional shape of the screening cage has been found to be particularly effective with the slanted sides preventing the meat from being forced into the corners of the same.

A crankshaft speed of 243 revolutions per minute producing 486 oscillations of the screening cage per minute and with an amplitude of oscillation of the basket of approximately 85° of arc has been found particularly effective. The reinforced construction of the frame including the diagonal bracing results in a rigid rugged construction for withstanding the necessary stresses. Although the precise dimensions and speed and amplitude of operation have been particularly effective, the examples are given by way of illustration rather than limitation, except as required by the prior art.

The separation above described may be aided by the use of fluid under pressure applied to the material treated. The pivot pins 61 supporting the screening cage may be provided with a longitudinal bore therethrough in which a tube 129 is supported. The tube 129 is provided with nozzles 130 or other jet forming means for directing fluid under pressure against the material in the screening cage. The tube 129 extends outwardly of the entire casing through a slot 131 in the access plate 103. A valve 132 is arranged in the fluid supply pipe 133 for controlling the flow of air, water or the like fluid from any suitable source to the tube 129.

The fluid supplied may be drying air under pressure sufficient to agitate the material and dry the same to an appreciable extent and such drying action causes the particles of bones to become whiter whereby any particles of bones passing through the grating may be readily observed and removed either by manual methods or by mechanical means which may include photoelectric cells or the like. Also the dry bone particles may be readily separated from the meat particles by floatation in a brine solution whereby the dry cellular bones will float and can be removed by skimming the solution containing the submerged meat particles.

The fluid for treating the material in the screening cage may be a liquid which produces additional agitation and scouring of the material within the basket. When liquid is used, a suitable trough arrangement is provided for carrying away the liquid and such trough may be formed by the panel 97 and the upstanding webs 97'. The liquid may then be drained from the meat and the meat is ready for further processing or canning. Agitation may be accomplished entirely by the fluid in some instances and the tube 129 may be oscillated about its axis by suitable means such as cranks, cams, or the like.

It will be obvious to those skilled in the art that various changes may be made in this device without departing from the spirit of the invention and therefore the invention is not limited by that which is shown in the drawing and described in the specification but only as indicated in the appended claims.

What is claimed is:

1. The method of separating meat from the bones of cooked chicken necks and for separating other materials having relatively hard and relatively soft separable portions, comprising projecting material to be separated at high velocity, suddenly stopping the movement thereof to permit the harder and softer portions to be separated by the change due to difference in weight of said harder and softer portions, projecting the material at high velocity in another direction, and stopping such motion in like manner suddenly, and repeating the operation until the material is separated.

2. In the method of claim 1 the additional step of subjecting the material to extraneous force to facilitate separation.

3. In the method of claim 1 the additional step of subjecting the material to fluid under pressure to facilitate separation.

4. In the method of claim 1 the additional step of collecting the softer separated material.

References Cited in the file of this patent

UNITED STATES PATENTS

| 126,475 | Millard | May 7, 1872 |
| 308,740 | Boone | Dec. 2, 1884 |
| 2,608,716 | Harris | Sept. 2, 1952 |